(12) United States Patent
Harmon et al.

(10) Patent No.: US 12,091,097 B2
(45) Date of Patent: Sep. 17, 2024

(54) PIVOTABLE CAB BACK ASSEMBLY FOR A VEHICLE AND CAB BACK ASSEMBLY PIVOTING METHOD

(71) Applicant: Ford Global Technologies, LLC, Dearborn, MI (US)

(72) Inventors: Michael Harmon, Westland, MI (US); Martin Delonis, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 748 days.

(21) Appl. No.: 17/110,937

(22) Filed: Dec. 3, 2020

(65) Prior Publication Data

US 2022/0177052 A1 Jun. 9, 2022

(51) Int. Cl.
*B62D 33/06* (2006.01)
*B60J 5/10* (2006.01)
*B62D 33/02* (2006.01)
*E04H 15/06* (2006.01)

(52) U.S. Cl.
CPC .............. *B62D 33/06* (2013.01); *B60J 5/108* (2013.01); *B62D 33/0207* (2013.01); *E04H 15/06* (2013.01); *E05Y 2900/53* (2013.01)

(58) Field of Classification Search
CPC .......... B62D 33/027; B62D 33/06; B60J 5/12; B60J 5/108
USPC ........... 296/24.43, 146.13, 190.11, 56, 146.8
See application file for complete search history.

(56) References Cited

U.S. PATENT DOCUMENTS

| 3,658,375 A | 4/1972 | Bowen |
| 4,252,363 A | 2/1981 | Rodrigue |
| 6,068,327 A * | 5/2000 | Junginger ............. E05F 1/1091 296/146.13 |
| 6,276,751 B1 * | 8/2001 | Ikarashi .................. B60P 3/423 296/183.1 |
| 6,386,618 B1 * | 5/2002 | Luckow ................. B62D 25/04 296/183.1 |
| 6,447,039 B1 * | 9/2002 | Song ........................ B60P 3/40 296/100.07 |
| 6,454,341 B2 * | 9/2002 | Tolinski ................. B60J 1/1861 296/106 |
| 6,505,882 B1 | 1/2003 | Morbach et al. |
| 6,786,535 B1 | 9/2004 | Grzegorzewski et al. |
| 8,366,176 B2 * | 2/2013 | Kaburaki ................ E05F 15/63 296/146.4 |

(Continued)

FOREIGN PATENT DOCUMENTS

JP 2005329739 12/2005

*Primary Examiner* — Jason S Morrow
(74) *Attorney, Agent, or Firm* — Vichit Chea; Carlson, Gaskey & Olds, P.C.

(57) ABSTRACT

A vehicle assembly includes, among other things, a cab back assembly having a first panel and a second panel. The first panel is pivotably coupled to a cab of a vehicle. The second panel is pivotably coupled to the first panel. A method of configuring a cab back includes selectively pivoting a first panel of a cab back assembly relative to a cab of a vehicle. The first panel is pivotably coupled to a cab of the vehicle and is configured to pivot relative to the cab about a first axis. The method further includes selectively pivoting a second panel of the cab back assembly relative to the first panel. The second panel is pivotably coupled to the first panel and is configured to pivot relative to the first panel about a second axis that is spaced from the first axis.

18 Claims, 5 Drawing Sheets

(56) References Cited

U.S. PATENT DOCUMENTS

| | | | |
|---|---|---|---|
| 10,350,972 B2* | 7/2019 | Azzouz | B60J 5/00 |
| 11,448,002 B2* | 9/2022 | Lee | B60J 5/101 |
| 11,565,645 B2* | 1/2023 | Salter | B60P 3/341 |
| 2001/0030448 A1 | 10/2001 | Wilson | |
| 2002/0070573 A1* | 6/2002 | Song | B60P 3/40 |
| | | | 296/26.11 |
| 2006/0152029 A1 | 7/2006 | Tomasson et al. | |
| 2008/0238122 A1* | 10/2008 | Leopold | B60R 5/041 |
| | | | 296/56 |
| 2009/0039675 A1 | 2/2009 | King et al. | |
| 2022/0136297 A1* | 5/2022 | Roberson | E05D 15/26 |
| | | | 49/37 |
| 2022/0266915 A1* | 8/2022 | Salter | B60J 5/108 |

* cited by examiner

PIVOTABLE CAB BACK ASSEMBLY FOR A VEHICLE AND CAB BACK ASSEMBLY PIVOTING METHOD

TECHNICAL FIELD

This disclosure relates generally to a cab back assembly for a vehicle and, more particularly, to a cab back assembly that can pivot into a plurality of configurations.

BACKGROUND

A typical pickup truck has a cab providing a passenger compartment and a cargo bed providing a cargo area. A cab back can separate the passenger compartment from the cargo area. In some pickup trucks, such as unibody pickup trucks, the cab back can provide a front wall of the cargo bed.

SUMMARY

A vehicle assembly according to an exemplary aspect of the present disclosure includes, among other things, a cab back assembly having a first panel and a second panel. The first panel is pivotably coupled to a cab of a vehicle. The second panel is pivotably coupled to the first panel.

In another example of the foregoing assembly, the first panel is an upper panel, and the second panel is a lower panel. The upper panel is vertically above the lower panel when the cab back assembly is in a closed position.

In another example of any of the foregoing assemblies, the vehicle is a unibody vehicle having a unibody configuration.

In another example of any of the foregoing assemblies, an upper region of the first panel is pivotably coupled to a roof of a cab of the vehicle.

In another example of any of the foregoing assemblies, the second panel is pivotably coupled to a lower region of the first panel.

In another example of any of the foregoing assemblies, the first panel is configured to pivot relative to the roof about a first axis, and the second panel is configured to pivot relative to the first panel about a second axis that is vertically beneath the first axis when the cab back assembly is in a closed position In another example of any of the foregoing assemblies, the first panel is configured to pivot relative to the cab about the first axis without pivoting the second panel relative to first panel about the second axis.

Another example of any of the foregoing assemblies includes a support configured to selectively interface with a sidewall of a cargo bed of the vehicle to support the second panel when the cab back assembly is in an open position.

In another example of any of the foregoing assemblies, the support is configured to move back and forth between a retracted position and an extended position.

In another example of any of the foregoing assemblies, the support extends from a laterally facing side of the cab back assembly to interface with the sidewall of the cargo bed.

Another example of any of the foregoing assemblies, includes at least one leg configured to interface with a sidewall of a cargo bed of the vehicle to support the cab back assembly in an open position.

In another example of any of the foregoing assemblies, the leg is pivotably connected to the cab back assembly. The leg configured to pivot back and forth between a stowed position and a deployed position. The leg in the deployed position supports the cab back assembly in the open position.

In another example of any of the foregoing assemblies, the cab back assembly separates a passenger compartment of the vehicle from a cargo area of the vehicle when the cab back assembly is in a closed position. The passenger compartment opens to the cargo bed when the cab back assembly is in an open position.

In another example of any of the foregoing assemblies, the vehicle is an electrified vehicle.

A method of configuring a cab back assembly according to another exemplary aspect of the present disclosure includes selectively pivoting a first panel of a cab back assembly relative to a cab of a vehicle. The first panel is pivotably coupled to a cab of the vehicle and is configured to pivot relative to the cab about a first axis. The method further includes selectively pivoting a second panel of the cab back assembly relative to the first panel. The second panel is pivotably coupled to the first panel and is configured to pivot relative to the first panel about a second axis that is spaced from the first axis.

In another example of the foregoing method, the first panel is an upper panel, and the second panel is a lower panel. The upper panel is vertically above the lower panel when the cab back assembly is in a closed position.

In another example of any of the foregoing methods, the second panel is pivotably coupled to a lower region of the first panel.

In another example of any of the foregoing methods, the cab back assembly separates a passenger compartment of the vehicle from a cargo area of the vehicle when the cab back assembly is in a closed position. The passenger compartment opens to the cargo bed when the cab back assembly is in an open position.

Another example of any of the foregoing methods includes extending a least one support laterally from a retracted position to an extended position where the at least one support interfaces with a sidewall of a cargo bed of the vehicle to support the cab back assembly in an open position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally a cab back assembly for a vehicle. The vehicle can be a unibody pickup truck. The vehicle can be an electrified vehicle having a traction battery that provides power to one or more motors used drive wheels of the vehicle.

The cab back assembly can be moved between a closed position and one of several possible open positions. Moving the cab back assembly to an open position opens a passenger compartment of the vehicle to a cargo area of the vehicle.

Figure 1:
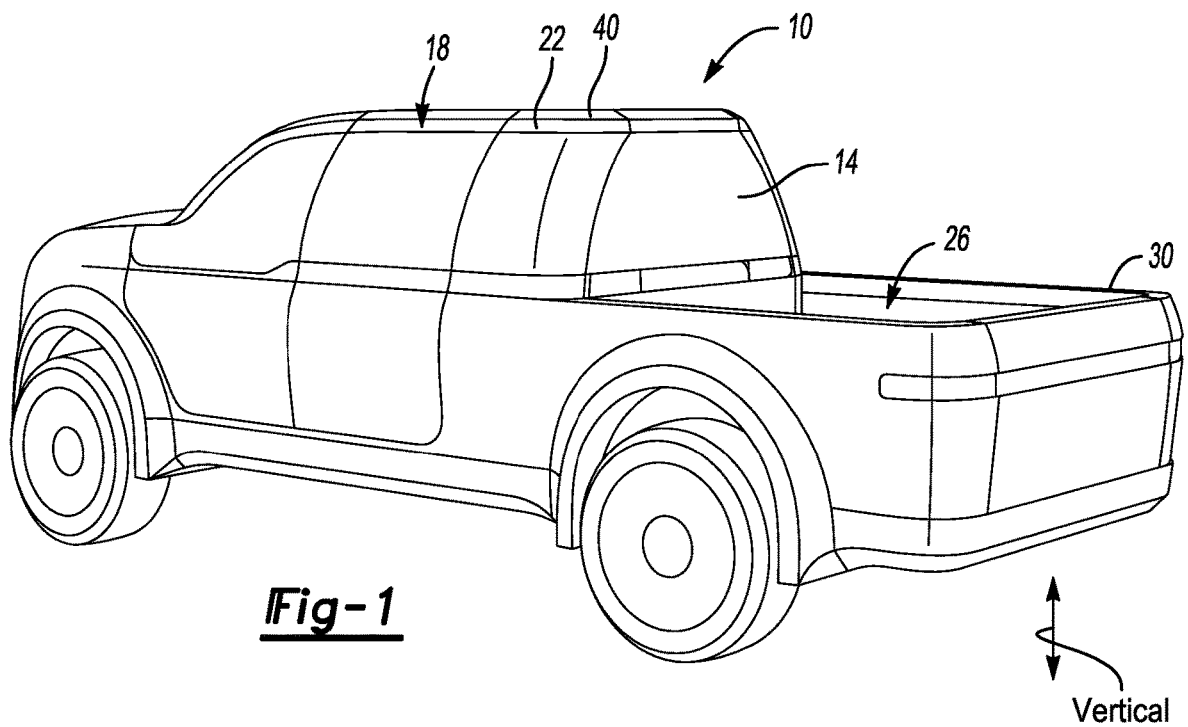
FIG. 1 illustrates a vehicle including a cab back assembly in a closed position according to an exemplary aspect of the present disclosure.
Figure 2:
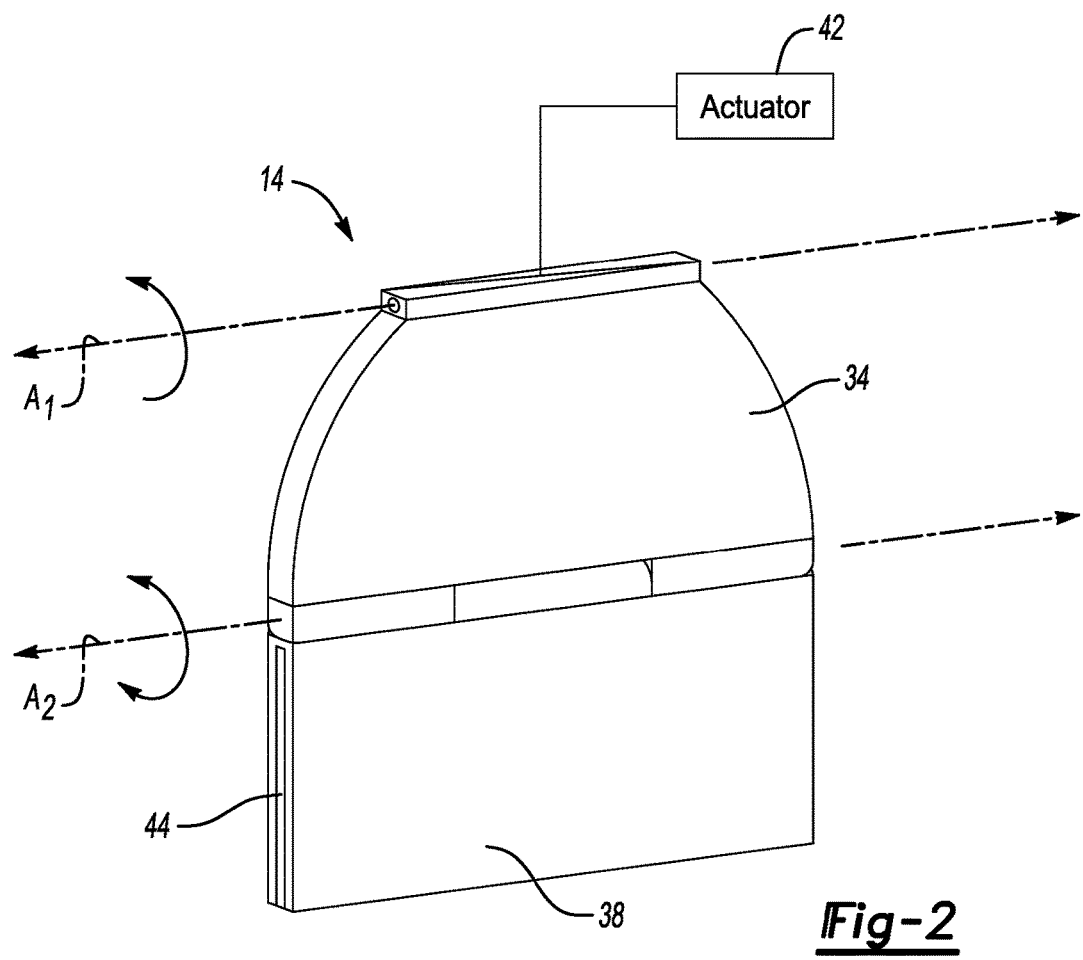
FIG. 2 illustrates a perspective view of the cab back assembly of FIG. 1.

With reference to FIGS. 1 and 2, a vehicle 10 includes a cab back assembly 14, a passenger compartment within a cab 22, and a cargo area 26 within a cargo bed 30.

The cab back assembly 14 is shown in a closed position in FIG. 1. When the cab back assembly 14 is in the closed position, the cab back assembly 14 closes off the passenger compartment 18 from the cargo area 26.

The exemplary vehicle 10 is a unibody pickup truck. As the vehicle 10 has a unibody configuration, the cab 22 and the cargo bed 30 are not supported on a vehicle frame separate from the cab 22 and the cargo bed 30. In the vehicle 10, the cab back assembly 14 provides both the back wall of the cab 22 and a front wall of the cargo bed 30 when the cab back assembly 14 is in the closed position.

A conventional body-on-frame vehicle is different than a unibody vehicle. In a conventional body-on-frame vehicle, a back wall of the cab is spaced a distance from a front wall of a cargo bed to provide an open gap between the cab and the cargo bed. The back wall of the cab is not directly connected to the front wall of the cargo bed in a conventional body-on-frame vehicle.

The cab back assembly 14 includes, in the exemplary embodiment, a first panel 34 and a second panel 38. The first panel 34 is a vertically upper panel. The second panel 38 is a vertically lower panel. When in the closed position, the first panel 34 is vertically above the second panel 38. Vertical, for purposes of this disclosure, is in reference to ground in the general orientation of the vehicle during operation.

An upper region of the first panel 34 is pivotably connected to the cab 22 of the vehicle. The pivotable connection permits the first panel 34 to pivot relative to the cab 22 about a first axis $A_1$. A roof 40 of the vehicle 10 is vertically aligned with the first axis $A_1$ in this example. A person having skill in this art and the benefit of this disclosure could understand how to pivotably couple a panel to a cab of a vehicle.

An upper region of the second panel 38 is pivotably coupled to a lower region of the first panel 34. The pivotable connection between the second panel 38 and the first panel 34 permits pivoting of the second panel 38 relative to the first panel about the second pivot axis $A_2$. A person having skill in this art and the benefit of this disclosure could understand how to pivotably couple a panel to another panel.

Figure 3:
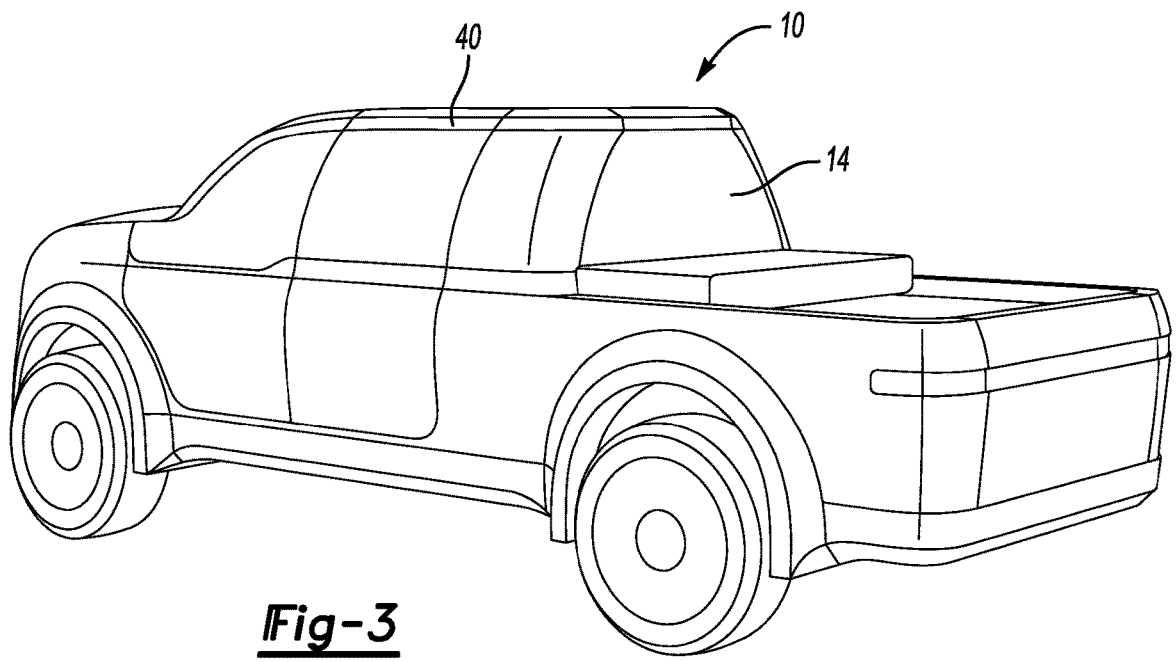
FIG. 3 illustrates the vehicle of FIG. 1 after the cab back assembly has been moved from the closed position into a first open position.
Figure 3A:
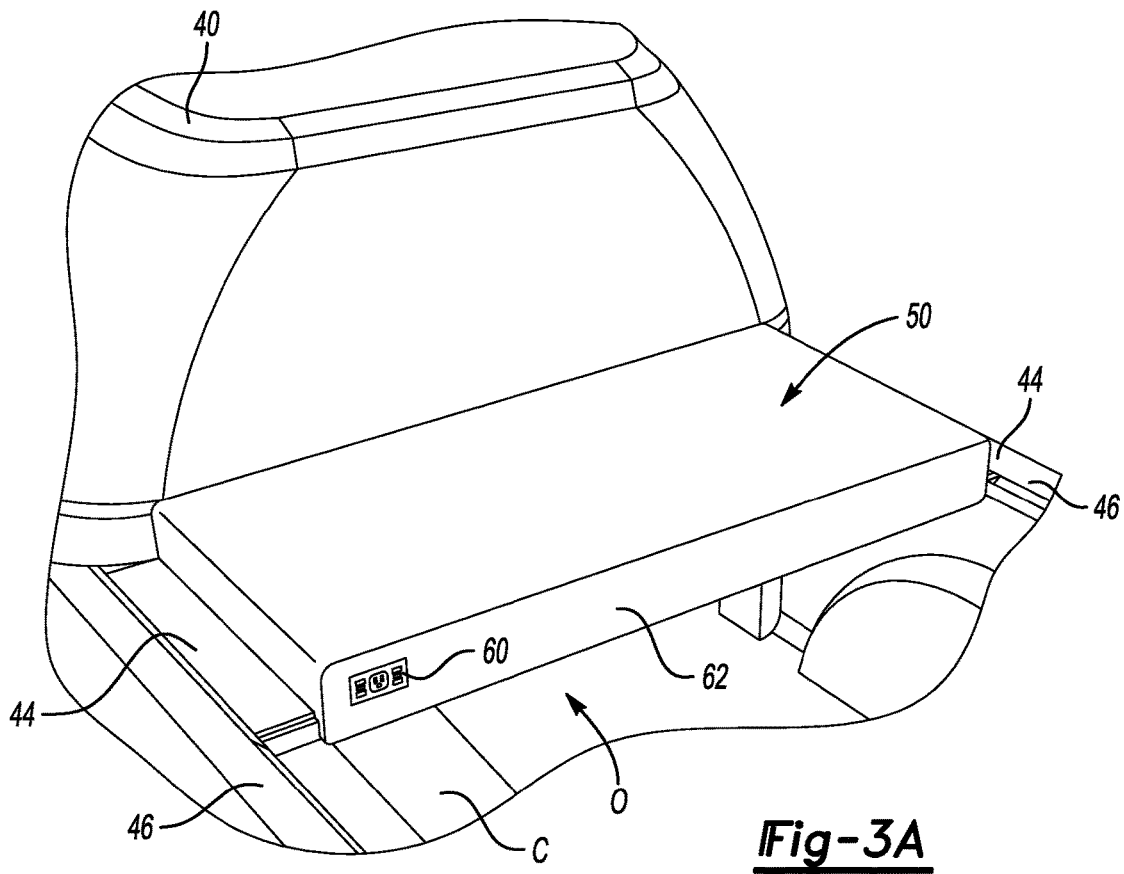
FIG. 3A illustrates a close-up view of the cab back assembly in FIG. 3.

The pivotable connection between the second panel 38 and the first panel 34 permits the second panel 38 to pivot about the axis $A_2$ from the closed position shown in FIGS. 1 and 2 to the first open position shown in FIGS. 3 and 3A. In the exemplary embodiment, an actuator 42 within the vehicle 10 drives the pivoting of the second panel 38 from the closed position of FIGS. 1 and 2 to the first open position. In another example, a user could manually pivot the second panel 38 about the axis $A_2$.

In the exemplary embodiment, after pivoting the second panel 38 relative to the first panel 34 to the first open position of FIGS. 3 and 3A, supports 44 of the cab back assembly 14 are extended laterally outward from a retracted position shown in FIG. 2 to the extended position shown in FIGS. 3 and 3A.

When in the extended position, the supports 44 rest on sidewalls 46 of the cargo bed 30 to help support the second panel 38 in the first open position of FIGS. 3 and 3A. The supports 44 can, in some examples, rest within recessed areas of the sidewalls 46 when in the extended position. This can prevent the supports 44 from being vertically proud of the sidewalls 46 where the supports 44 would be less aerodynamic.

The supports 44 are shown as planar flanges. In other examples, the supports 44 could be peg-shaped structures that extend into slots or recessed areas within the sidewalls 46.

In this first open position, the cab back assembly 14 no longer closes off the passenger compartment 18 from the cargo bed 30. Cargo C, particularly oversized, long cargo that would not fit in the cargo area 26, can then be transported within the vehicle 10. Particularly lengthy cargo could extend from the cargo area 26, through the passenger compartment 18, into a frunk of the vehicle 10. Electrified vehicles in particular can include frunks.

The cargo C can extend through an opening O such that a portion of the cargo C resides in the passenger compartment 18, and another portion of the cargo C resides in the cargo bed 30. The opening O substantially provides the clearance required for the vehicle 10 to transport oversized and irregular types of cargo C.

Positioning a cab back assembly 14 in the first open position of FIGS. 3 and 3A also provides a work surface 50 on the second panel 38. The work surface 50 is horizontally aligned. The user may utilize the work surface 50 to support a tool 54 as shown in FIGS. 3B and 3C.

In some examples, A base 58 of the tool 54 is directly attached to the second panel 38. In such examples, the tool 54 pivots with the second panel 38 when the second panel 38 is transitioned from the first open position of FIG. 3B to the closed position of FIG. 3C. The cab back assembly 14 thus helps to stabilize the tool 54 as the vehicle is driven, and to secure the tool 54. When a user desires to use the tool 54, the user can reconfigure the second panel 38 from the position of FIG. 3C into the position of FIG. 3B. The base 58 can help to protect the second panel 38 from damage as the user utilizes the work surface 50. The base 58 can be a wooden base, for example.

The second panel 38, or another portion of the cab back assembly 14, could include an electrical outlet 60 utilized to power the tool 54. In this example, the electrical outlet 60 is disposed in a side 62 of the second panel 38 that faces downward and is hidden when the cab back assembly 14 is in the closed position. This can help to shield the electrical outlet 60 from tampering and environmental elements when the electrical outlet 60 is not being used.

Figure 3B:
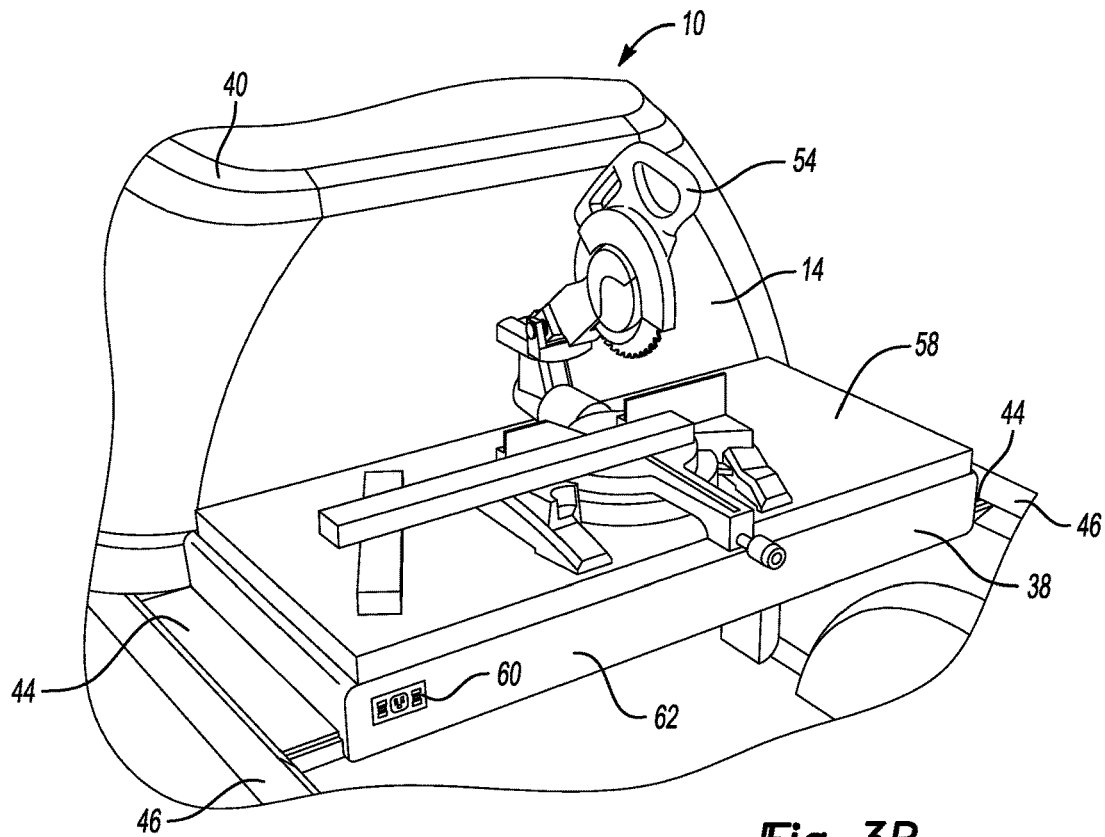
FIG. 3B illustrates a tool assembly attached to the cab back assembly in the first open position of FIG. 3.
Figure 3C:
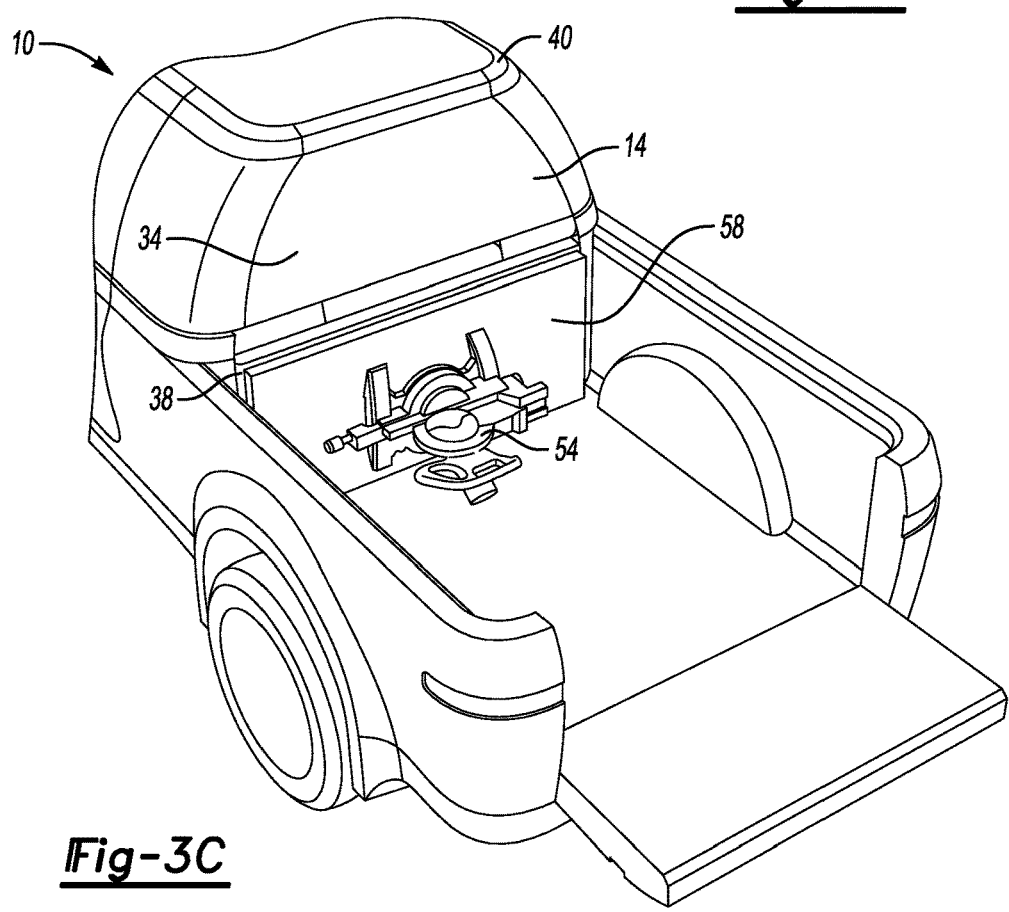
FIG. 3C illustrates the cab back assembly of FIG. 3B moved to a closed position with the tool of FIG. 3B remaining attached to the cab back assembly.

In the first open position of FIGS. 3-3B, the first panel 34 is not rotated about the pivot axis $A_1$ from the position of FIG. 1. Other open positions are possible when the first panel is rotated about the pivot axis $A_1$.

Figure 4:
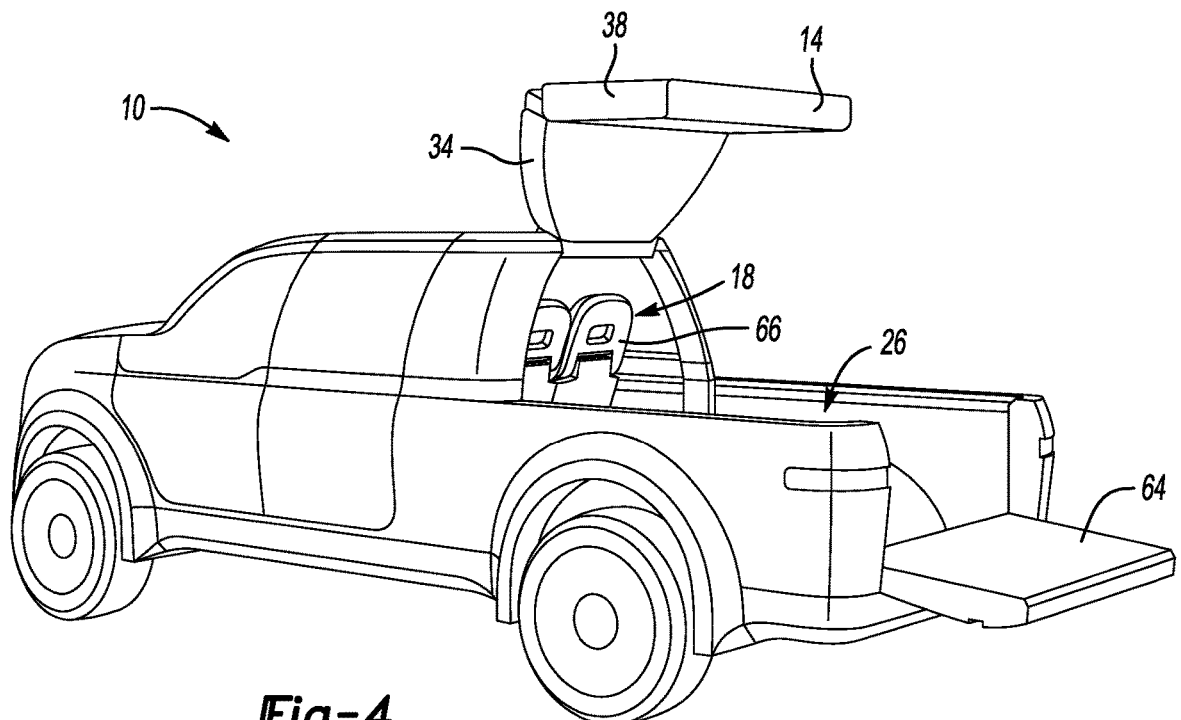
FIG. 4 illustrates the vehicle of FIG. 1 after the cab back assembly has been moved from the closed position into a second open position.

With reference to FIG. 4, the cab back assembly 14 is shown in another configuration where the first panel 34 has been rotated about the axis $A_1$ from the position of FIG. 1. The second panel 38 has also been rotated about the axis $A_2$ from the position of FIG. 1. When the cab back assembly 14 is in the position of FIG. 4, the cab back assembly 14 is in a second open position.

In the second open position, the cab back assembly 14 has been rotated enough to increase a size of the opening O between the passenger compartment 18 and the cargo area. Users can then move back and forth between the passenger compartment 18 and the cargo area 26 through the opening. The user may open a tailgate 64 of the vehicle to facilitate access to and from the cargo bed 30. The user may reconfigure seats 66 within the vehicle 10 to positions that allow the user to look toward a rear of the vehicle 10 through the opening. The user may reconfigure seats 66 of the vehicle to increase areas available for storing cargo.

Figure 4A:
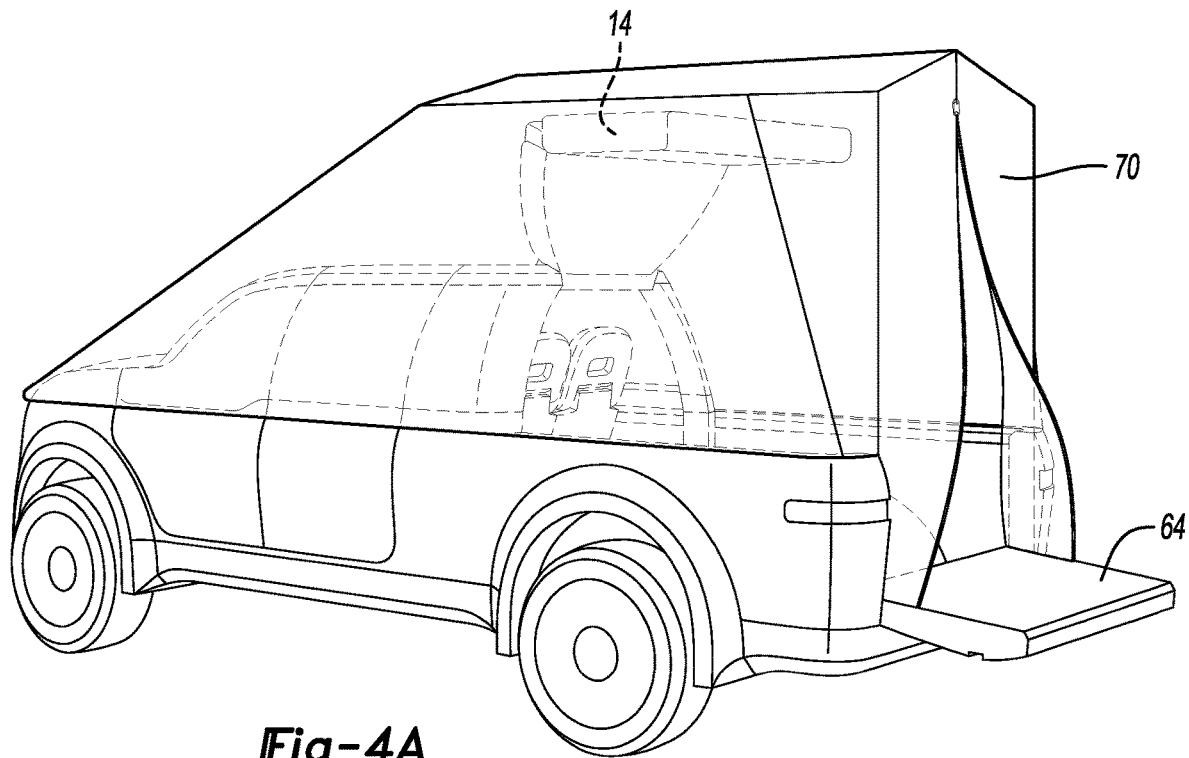
FIG. 4A illustrates a canopy supported, at least in part, by the cab back assembly in the second open position of FIG. 4.

In some examples, the cab back assembly 14 can be used to support a tent 70 when the cab back assembly 14 is in an open position. As shown in FIG. 4A, the tent 70 is supported at least in part by the cab back assembly 14 in the second open position. The passenger compartment 18, the cargo bed 30, or both could then be utilized by users for sleeping and relaxing while the users are covered by the tent 70. The seats, in some examples, can be turned so that a user seated in the seat faces rearward.

Figure 5:
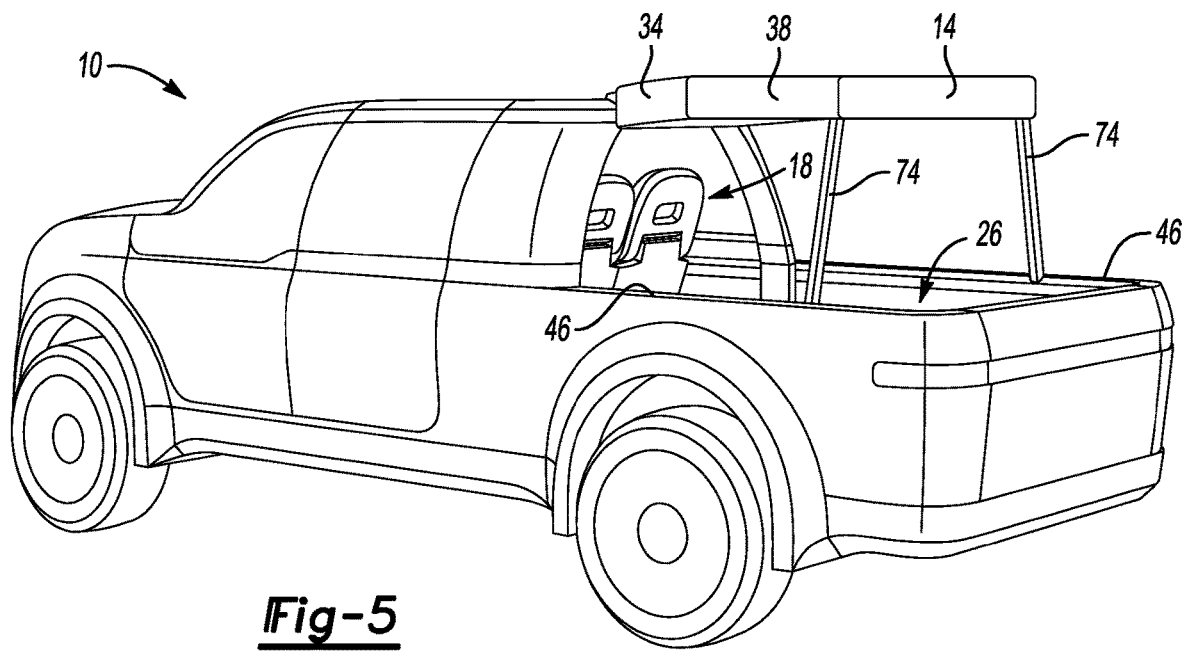
FIG. 5 illustrates the vehicle of FIG. 1 after the cab back assembly has been moved from the closed position into a third open position.

With reference now to FIG. 5, the cab back assembly 14 is shown in a third open position where the first panel 34 has been partially rotated about the first axis $A_1$ and the second panel 38 is not rotated about the second axis $A_2$ from the closed position of FIG. 1. The cab back assembly 14 in the third open position does not extend vertically upward past the roof a significant amount.

The cab back assembly 14, in the exemplary embodiments, include legs 74 that flip down to engage with locators on the sidewalls 46. The legs 74 can help to support the cab back assembly 14 when the cab back assembly is in the third open position of FIG. 5. The legs 74 can be considered prop-rods.

In the third open position, oversized cargo can be placed within the cargo area 26 and within the passenger compartment 18. The third open position of FIG. 5 provides more vertical height to accommodate cargo than the first open position of FIGS. 3 and 3A. In the third open position, the cab back assembly 14 covers more of the cargo area 26 than the cab back assembly 14 in the first open position or the second open position. Covering more of the cargo area 26 with the cab back assembly 14 may be desirable to provide shade, for example.

The cab back assembly 14 can be moved manually between the closed position and the various open positions of FIGS. 3-5. The cab back assembly 14 can instead be moved automatically by the actuator 42 between the closed position and the various open positions.

The movement of the cab back assembly 14 between the closed position and the various open positions can be movement that clears a trailer coupled to the vehicle 10 via a gooseneck or fifth wheel type of attachment.

The cab back assembly 14 can be moved to open positions other than the first, second, and third open positions shown.

Further, the features described in connection with one of the exemplary open positions can be used, where appropriate, with other open positions. For example, the tent 70 could be supported by the cab back assembly 14 in the third open position rather than the second open position.

Figure 6:
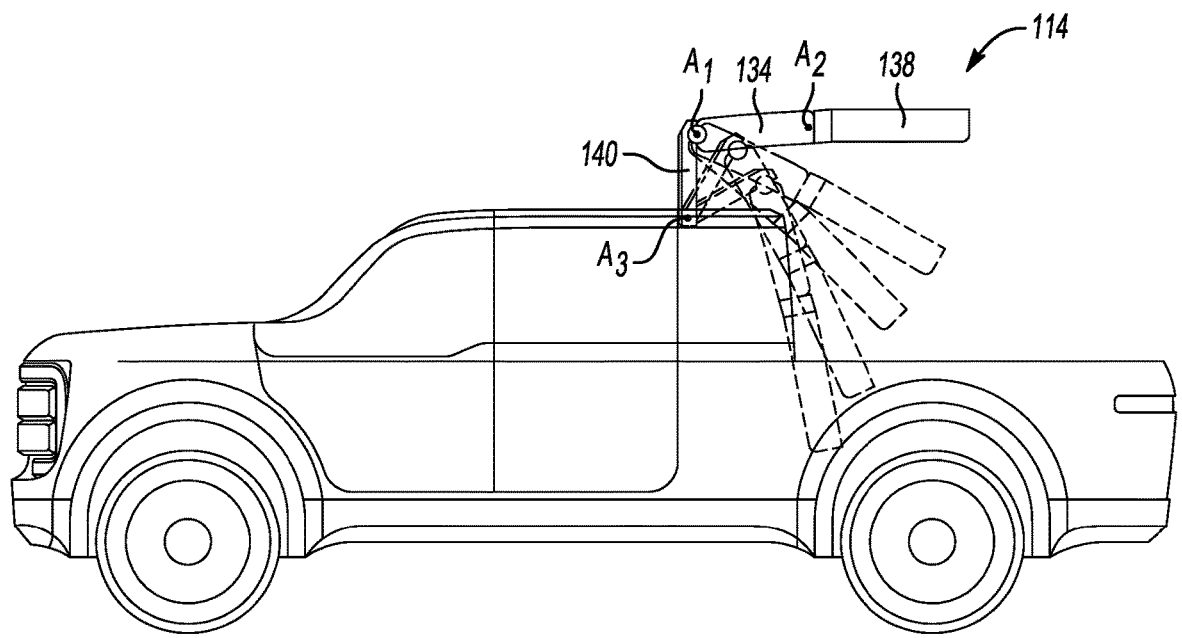
FIG. 6 illustrates a cab back assembly according to another exemplary aspect of the present disclosure.

FIG. 6 shows a cab back panel 114 according to another exemplary embodiment. The cab back panel 114 includes a first panel 134 pivotably coupled to a roof panel 140 that provides part of a cab of the vehicle. The roof panel 140 is pivotably coupled to other portions of the cab and can pivot relative to other portions of the cab about a pivot axis $A_3$.

The pivoting of the roof panel 140 about the axis $A_3$ may help the first panel 134 and and the second panel 138 maintain clearance to other structures when pivoting, such as a trailer attached to the vehicle via a gooseneck or fifth wheel type of attachment The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A cab back assembly, comprising:
a cab back assembly having a first panel and a second panel, the first panel is pivotably coupled to a cab of a vehicle, the second panel is pivotably coupled to the first panel,
wherein the vehicle is a pickup truck, the cab back assembly in a closed position separates a passenger compartment of the pickup truck from a cargo area of the pickup truck, the cargo area within a cargo bed,
wherein the first panel is vertically above the second panel when the first panel is in a first panel closed position, the second panel pivotable relative to the first panel when the first panel is in the first panel closed position.

2. The cab back assembly of claim 1, wherein the vehicle is a unibody vehicle having a unibody configuration.

3. The cab back assembly of claim 1, wherein an upper region of the first panel is pivotably coupled to a roof of a cab of the vehicle.

4. The cab back assembly of claim 3, wherein the second panel is pivotably coupled to a lower region of the first panel.

5. The cab back assembly of claim 3, wherein the first panel is configured to pivot relative to the roof about a first axis, and the second panel is configured to pivot relative to the first panel about a second axis that is vertically beneath the first axis when the first panel is in the first panel closed position.

6. The cab back assembly of claim 5, wherein the first panel is configured to pivot relative to the cab about the first axis without pivoting the second panel relative to first panel about the second axis.

7. The cab back assembly of claim 1, further comprising at least one support, the at least one support configured to selectively interface with a sidewall of the cargo bed of the vehicle to support the second panel when the second panel is in an open position and the first panel is in the first panel closed position.

8. A vehicle assembly, comprising:
a cab back assembly having a first panel and a second panel, the first panel is pivotably coupled to a cab of a vehicle, the second panel is pivotably coupled to the first panel; and at least one support, the at least one support configured to selectively interface with a sidewall of a cargo bed of the vehicle to support the second panel when the second panel is in an open position and the first panel is in a first panel closed position, wherein the first panel is vertically above the second panel when the first panel is in a first panel closed position, the second panel pivotable relative to the first panel when the first panel is in the first panel closed position, wherein the at least one support is configured to move back and forth between a retracted position and an extended position, the at least one support retracted within the second panel when the at least one support is in the retracted position.

9. The cab back assembly of claim 7, wherein the at least one support extends from a laterally facing side of the cab back assembly to interface with the sidewall of the cargo bed.

10. The cab back assembly of claim 1, further comprising at least one leg | configured to interface with a sidewall of the cargo bed of the vehicle to support the cab back assembly in an open position.

11. The cab back assembly of claim 10, wherein the at least one leg is pivotably connected to the cab back assembly, the at least one leg configured to pivot back and forth between a stowed position and a deployed position, the at least one leg in the deployed position supporting the cab back assembly in the open position.

12. The cab back assembly of claim 1, wherein the vehicle is an electrified vehicle.

13. A method of configuring a cab back assembly, comprising:

selectively pivoting a first panel of a cab back assembly relative to a cab of a vehicle, the first panel pivotably coupled to a cab of the vehicle and configured to pivot relative to the cab about a first axis; and when the cab back assembly is in a closed position, selectively pivoting a second panel of the cab back assembly away from the cab of the vehicle without pivoting the second panel, +the second panel pivotably coupled to the first panel and configured to pivot relative to the first panel about a second axis that is spaced from the first axis, wherein the vehicle is a pickup truck, wherein the cab back assembly separates a passenger compartment of the pickup truck from a cargo bed of the vehicle when the cab back assembly is in a closed position, wherein the passenger compartment opens to the cargo bed when the cab back assembly is in an open position.

14. The method of claim 13, wherein the first panel is an upper panel, and the second panel is a lower panel, the upper panel vertically above the lower panel when the cab back assembly is in a closed position.

15. The method of claim 13, wherein the second panel is pivotably coupled to a lower region of the first panel.

16. The method of claim 13, further comprising extending at least one support laterally from a retracted position to an extended position where the at least one support interfaces with a sidewall of the cargo bed of the vehicle to support the cab back assembly in an open position, the at least one support retracted within the second panel when the at least one support is in the retracted position.

17. The cab back assembly of claim 1, wherein the second panel is pivotable relative to the first panel in a direction away from the cab.

18. The cab back assembly of claim 1, wherein the second panel is pivotable relative to the first panel in a direction away from the cab.

* * * * *